United States Patent
Chen

(10) Patent No.: US 7,509,303 B1
(45) Date of Patent: Mar. 24, 2009

(54) INFORMATION RETRIEVAL SYSTEM USING ATTRIBUTE NORMALIZATION

(75) Inventor: Chung-Ho Chen, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 362 days.

(21) Appl. No.: 10/349,762

(22) Filed: Jan. 22, 2003

Related U.S. Application Data

(63) Continuation of application No. 10/255,553, filed on Sep. 25, 2002, now abandoned.

(60) Provisional application No. 60/326,419, filed on Sep. 28, 2001.

(51) Int. Cl.
*G06F 7/00* (2006.01)
*G06F 17/30* (2006.01)
*G06F 12/00* (2006.01)
*G06F 13/00* (2006.01)
*G06F 13/28* (2006.01)
*G06F 15/16* (2006.01)
*G06F 3/048* (2006.01)
*G06Q 30/00* (2006.01)

(52) U.S. Cl. ............... 707/3; 707/4; 707/10; 705/26; 709/217; 711/100; 715/763

(58) Field of Classification Search ............ 707/3, 707/4, 10; 709/217; 715/763; 705/26; 711/100
See application file for complete search history.

(56) References Cited

U.S. PATENT DOCUMENTS

| | | | | | |
|---|---|---|---|---|---|
| 5,072,367 | A | * | 12/1991 | Clayton et al. ................. | 707/3 |
| 5,201,047 | A | * | 4/1993 | Maki et al. .................... | 707/4 |
| 5,627,979 | A | * | 5/1997 | Chang et al. ................ | 715/763 |
| 5,802,524 | A | * | 9/1998 | Flowers et al. ........... | 707/103 R |
| 5,897,639 | A | * | 4/1999 | Greef et al. .............. | 707/103 R |
| 5,913,210 | A | * | 6/1999 | Call .............................. | 707/4 |
| 5,960,080 | A | * | 9/1999 | Fahlman et al. .............. | 380/252 |
| 6,366,915 | B1 | * | 4/2002 | Rubert et al. ................. | 707/10 |
| 6,501,486 | B1 | * | 12/2002 | Lau ............................. | 715/762 |
| 6,711,563 | B1 | * | 3/2004 | Koskas ......................... | 707/3 |
| 7,047,211 | B1 | * | 5/2006 | Van Etten et al. ............. | 705/26 |
| 2002/0049724 | A1 | * | 4/2002 | Matsuzawa et al. ........... | 707/1 |
| 2002/0091791 | A1 | * | 7/2002 | Kang ......................... | 709/217 |

OTHER PUBLICATIONS

Wong et al, 'A Hybrid Approach to Address Normalization', Dec. 1994, vol. 9, pp. 38-45.*

Biskup, J. et al. "Database Dependency Theory: Synthesizing Independent Database Schemas" *Proceedings of the 1979 ACM SIGMOD International Conference on Management of Data* (May 1979) pp. 143-151.

(Continued)

*Primary Examiner*—Uyen T Le
*Assistant Examiner*—Cheryl M Shechtman
(74) *Attorney, Agent, or Firm*—Vista IP Law Group, LLP

(57) ABSTRACT

Information retrieval system that allows a user to retrieve data having different attributes from different databases is provided. The information retrieval system associates a search attribute of a subject represented by a user input term, with one or more attributes of data stored in the databases. Based on this association, data whose attribute is associated with the search attribute is collected and provided to the user as feedback.

71 Claims, 12 Drawing Sheets

20

OTHER PUBLICATIONS

Ceri, S. and G. Gottlob "Normalization of Relations and Prolog" *Communications of the ACM* (Jun. 1986) 29(6):524-544.

Date, C.J. and R. Fagin "Simple Conditions for Guaranteeing Higher Normal Forms in Relational Databases" *ACM Transactions on Database Systems (TODS)* (Sep. 1992) 17(3):465-476.

Diederich, J. and J. Milton "New Methods and Fast Algorithms for Database Normalization" *ACM Transactions on Database Systems (TODS)* (Sep. 1988) 13(3):339-365.

Fagin, R. "Multivalued Dependencies and a New Normal Form for Relational Databases" *ACM Transactions on Database Systems (TODS)* (Sep. 1977) 2(3):262-278.

Fagin, R. "A Normal Form for Relational Databases That is Based on Domains and Keys" *ACM Transactions on Database Systems (TODS)* (Sep. 1981) 6(3):387-415.

Gauch, S. et al. "A Corpus Analysis Approach for Automatic Query Expansion and its Extension to Multiple Databases" *ACM Transactions on Information Systems (TOIS)* (Jul. 1999) 17(3):250-269.

Libkin, L. "Normalizing Incomplete Databases" *Proceedings of the 14th ACM SIGACT-SIGMOD-SIGART Symposiun on Principles of Database Systems* (May 1995) pp. 219-230.

Loh, W.-K. et al. "Index Interpolation: An Approach to Subsequence Matching Supporting Normalization Transform in Time-Series Databases" *Proceedings of the 9th International Conference on Information and Knowledge Management* (Nov. 2000) pp. 480-487.

Markowitz, V.M. and A. Shoshani "Representing Extended Entity-Relationship Structures in Relational Databases: A Modular Approach" *ACM Transactions on Database Systems (TODS)* (Sep. 1992) 17(3):423-464.

Smith, H.C. "Database Design: Composing Fully Normalized Tables from a Rigorous Dependency Diagram" *Communications of the ACM* (Aug. 1985) 28(8):826-838.

Storey, V.D. and R.C. Goldstein "A Methodology for Creating User Views in Database Design" *ACM Transactions on Database Systems (TODS)* (Sep. 1988) 13(3):305-338.

Teorey, T.J. et al. "A Logical Design Methodology for Relational Databases Using the Extended Entity-Relationship Model" *ACM Computing Surveys (CSUR)* (Jun. 1986) 18(2):197-222.

Yu, C. et al, "Efficient and Effective Metasearch for a Large Number of Text Databases" *Proceedings of the 8th International Conference on Information and Knowledge Management* (Nov. 1999) pp. 217-224.

Yu, C. et al. "Efficient and Effective Metasearch for Text Databases Incorporating Linkages among Documents" *ACM SIGMOD Record, Proceedings of the 2001 ACM SIGMOD International Conference on Management of Data* (May 2001) 30(2):187-198.

\* cited by examiner

300a

| Mapping Table | | |
|---|---|---|
| Search Attribute | Data Source Identification | Attribute of Data |
| Name | Email Database | Sender |
| Name | Word Processing Database | Author |
| Name | Web Database | Person |
| Name | Phone Database | Name |
| Author | Software Database | Programmer |
| Title | Email Database | Subject |
| ⋮ | ⋮ | ⋮ |

| Name Index | |
|---|---|
| John | Email ID 123 |
| John | ABC.doc |
| John | Pg 2 of GHI.com |
| Mary | Email ID 456 |
| ⋮ | ⋮ |

| Name Index | | 510 |
|---|---|---|
| John | Email ID 123, ABC.doc, Pg 2 of GHI.com | |
| Mary | Email ID 456, ... | |
| ⋮ | ⋮ | |

FIG. 7

INFORMATION RETRIEVAL SYSTEM USING ATTRIBUTE NORMALIZATION

RELATED APPLICATION DATA

This application is a continuation of U.S. application Ser. No. 10/255,553, filed on Sep. 25, 2002, now abandoned, which claims the benefit of U.S. Provisional Application No. 60/326,419, filed on Sep. 28, 2001, both of which are hereby incorporated by reference in their entireties.

FIELD OF THE INVENTION

The present invention is directed towards the field of information retrieval systems.

BACKGROUND AND SUMMARY OF THE INVENTION

An information retrieval system attempts to match user queries (i.e., the users statement of information needs) to locate information available to the system. The information available to the system may be stored in an internet environment, an intranet system, or proprietary databases. In recent years, data sources accessible via hyper-text transfer protocol (HTTP) have been rapidly added. Also the number of independent proprietary databases and proprietary databases associated with applications have drastically increased. For example, a company may have more than one databases, each of which may be used by different groups or departments within the company. Also, a company may use a database that is different from or unassociated with another database used in another company.

Due to the tremendous increase of web-based information and proprietary databases, and due to the fact that many of these databases are disconnected or unassociated with one another, a user may not be able to efficiently retrieve all the information he/she needs. Particularly, in large companies, one department may not know what another department is doing. One department may use applications that are otherwise disconnected or incompatible with applications used by the other department. One department may also have access to a database that is otherwise unknown to the other department. As such, an employee who is looking for a particular information may not realize that the information he/she is seeking is categorized as something else in different databases. For example, an employee looking for a list of work produced by a person having the name, "John" may not realize that the name of the person is identified as "author" in a first database, or as a "work creator" in another database. Without knowledge of data categories or classifications that exist in separate sources of data, the ability for an individual to effectively retrieve relevant information he/she needs may be compromised.

The same problem also exists among companies that use different proprietary databases or databases that are associated with proprietary applications. Certain proprietary information that is accessible by two or more companies may be stored in one database of a company, and in a different database of another company. As such, an employee of one company may not be aware of the existence of another company's database that contains the information he/she is seeking.

Furthermore, existing information retrieval systems may be limited in their ability to provide feedback that has high precision. Precision, a common way to measure retrieval effectiveness in information retrieval systems, is defined as the ratio of the number of relevant documents retrieved over the total number of documents retrieved. Precision is measured with a value ranging between zero and one. An ideal information retrieval system has a precision value equal to one. Retrieval effectiveness is typically based on document relevance judgments. These relevance judgments are problematic since they are subjective and unreliable.

Particularly, a problem in obtaining high precision is that a user often inputs query term(s) that matches with data indexed in a database, but the search attribute of the query term is different from the attribute of the data indexed in the database. For example, a user who wishes to obtain a list of articles written by the author, John, may input as query terms, "John, author." However, the information retrieval system may provide, as feedback, articles written by someone else, and having the word, "John" in its contents. This is so because the information retrieval system does not recognize that the query term, "John," represents a subject that has an author attribute, not a content attribute. This problem has long been recognized as a major difficulty in information retrieval systems.

For these reasons, there is a need for a system that allows knowledge of data to be shared and transferred within and among business entities. There is also a need for a system that allows retrieval of information spread over numerous otherwise disconnected and incompatible applications within a network. The system should also be able to provide effective information retrieval having improved precision.

Information retrieval system that allows a user to retrieve data having different attributes or attribute labels from different databases is described below. The information retrieval system associates a search attribute of a subject represented by a user input term, with one or more attributes of data from one or more databases. Based on this association, data whose attribute is associated with the search attribute is collected and provided to the user as feedback.

Other embodiments of the information retrieval system and methods of using the same are also described. Other and further aspects and features of the invention will be evident from reading the following detailed description of the preferred embodiments, which are intended to illustrate, not limit, the invention.

BRIEF DESCRIPTION OF THE DRAWINGS

The drawings illustrate the design and utility of several embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 5 shows an attribute mapping table;

FIG. 6 shows an example of a search attribute based index table for the name attribute;

FIG. 7 is an example of an index, particularly showing data arranged in batch form;

DETAILED DESCRIPTION OF THE PREFERRED EMBODIMENTS

System Architecture

Figure 1:
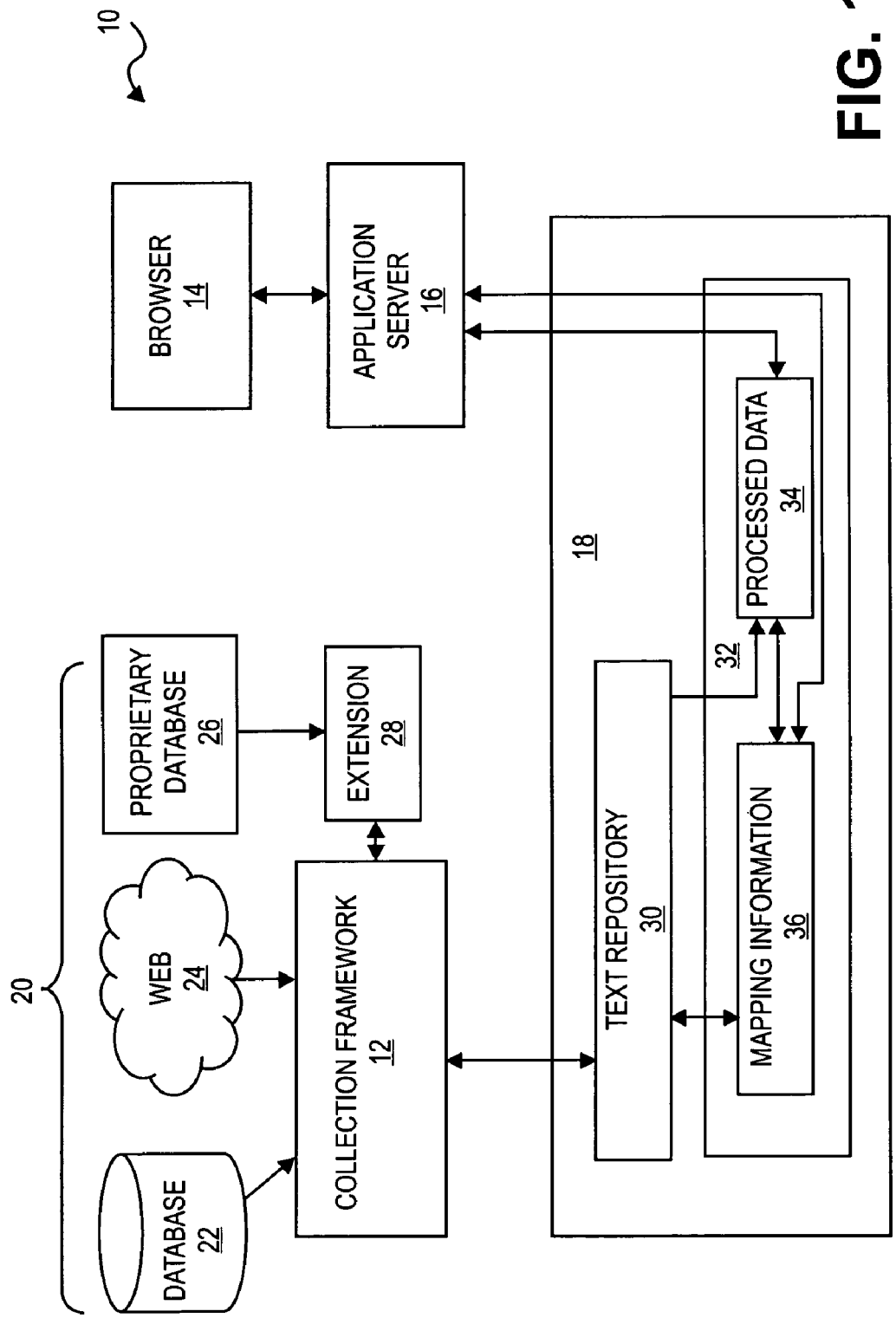
FIG. 1 is a system architecture that includes a repository for storing mapping information in accordance with an embodiment of the present invention.

FIG. 1 is a block diagram illustrating an architecture of an information retrieval system 10 in accordance with an embodiment of the present invention. The information retrieval system 10 includes a collection framework 12, a browser 14 for obtaining information from and presenting information to a user, an application server 16 for processing information to and from the browser 14, and a platform 18.

The collection framework 12 is configured to collect data from a data source 20. The data source 20 may include one or more databases 22. The database 22 can be located within an intranet environment. Alternatively, the database 22 can be located outside an intranet environment as well. The data source 20 can also include one or more web sites 24, and/or one or more proprietary databases 26. The collection framework 12 can be configured to extract designated metadata from the data source 20. Alternatively, the collection framework 12 can be configured to perform general metadata extraction, and the platform 18 then processes only those metadata that are specified by an administrator or a user. As shown in FIG. 1, to access the proprietary database 26, an extension 28 may be used to identify data source type and to communicate with the proprietary database 26.

The platform 18 is connected to the collection framework 12 and the application server 16. The platform 18 is responsible for processing and/or storing collected data from the collection framework 12. In an embodiment, the platform 18 includes a text repository 30 that stores information collected by the collection framework 12. The text repository 30 can contain collected data that are organized into indexes and/or tables, as will be described below. If required, the data collected by the collection framework 12 can be further processed and arranged in other forms or format before they are stored into the text repository 30. Although the text repository 30 is shown to be a part of the platform 18 in FIG. 1, the text repository 30 can be a separate component that is not a part of the platform 18.

The platform 18 also includes a repository 32, which provides a medium for storing mapping information 36, such as a mapping table as will be described below. The repository 32 does not have to be a part of the platform 18, and can be a separate component from the platform 18. Although not required, the repository 32 can be accessible by the collection framework 12 so that the mapping information 36 can be used by the collection framework 12. The repository 32 may also store processed data 34 which are collected data that have been processed into retrievable format. Alternatively, the text repository 30 can store the processed data 34.

The text repository 30 and/or the repository 32 can be a variety of mediums in which data or information can be stored. For examples, the text repository 30 and/or the repository 32 can be a server, a magnetic floppy disk, a magnetic tape, and a compact disc read only memory (CD-ROM).

As shown in FIG. 1, the application server 16 can have access to both the processed data 34 and the mapping information 36. Alternatively, depending on the type and/or format of the processed data 34 being stored, the application server 16 may only need to have access to the processed data 34. The processed data 34 and the mapping information 36 would be described in detail below.

Process

Figure 2:
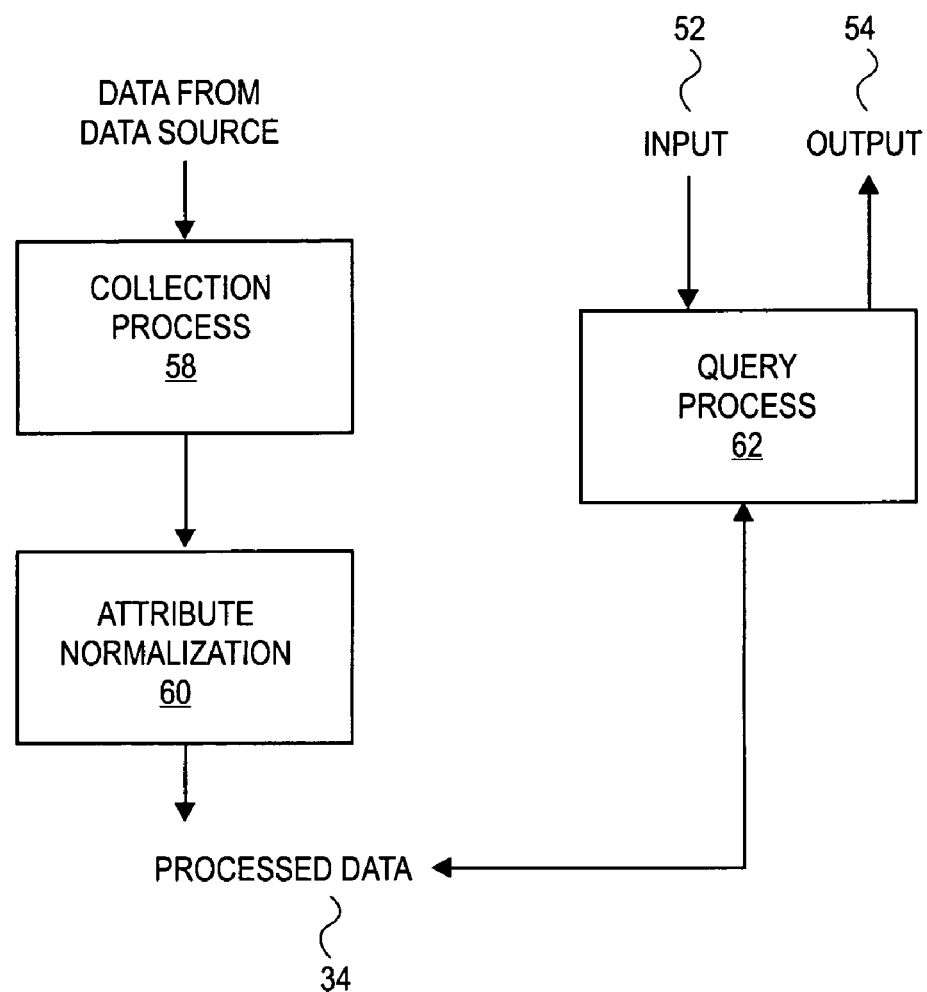
FIG. 2 is a block diagram illustrating the processing steps performed by the information retrieval system in accordance with an embodiment of the present invention.

FIG. 2 is block diagram illustrating the processes performed by the information retrieval system 10 of FIG. 1 in accordance with an embodiment of the present invention. In general, the information retrieval system 10 receives, as input 52, a user input query, and generates, as output 54, search results containing information from the data source 20. The user input 52 can be one or more query terms, representing one or more subjects that are of interest to the user. A query term may consist of either a word, a phrase, or a sentence.

Figure 3A:
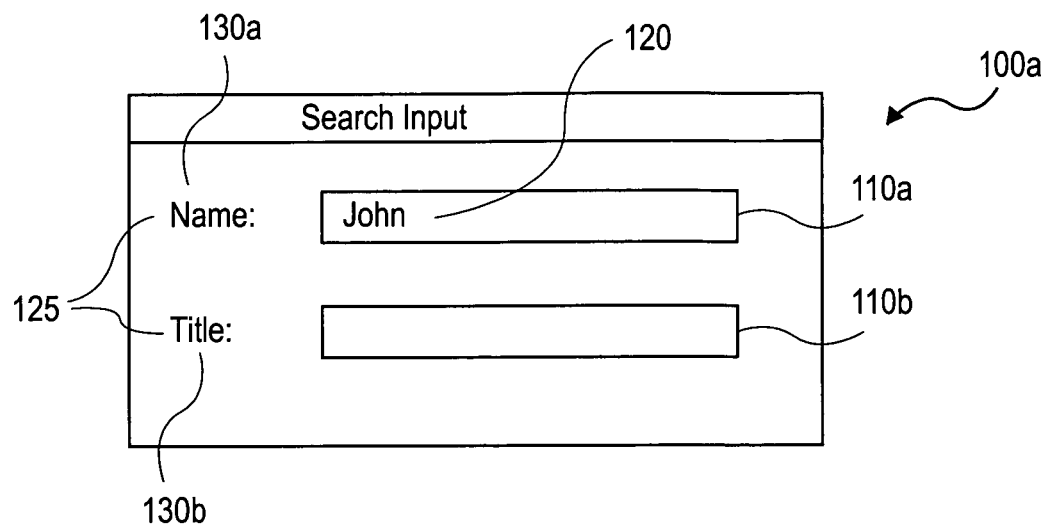
FIG. 3A is an example of an input window used to receive input for the information retrieval system.

FIG. 3A shows an example of a user interface 100a to be presented in a screen display for receiving the input 52. The user interface 100a, which may be provided by the browser 14 of FIG. 1, includes one or more fields 110 in which the user can type in query term(s) 120. Each of the subjects represented by the query term has a search attribute 125. As shown in FIG. 3A, the subject represented by the search term, "John," inputted in the filed 110a, has an attribute 125 indicated by a label 130a, "name". In other words, the subject represented by the search term, "John" has a name attribute 125. The attribute 125 of the subject represented by the query term 120 can vary, and it depends on the particular application. For example, the attribute 125 can be title, project, address, etc.

The attribute 125 is stored as a part of the mapping information 36 in the repository 32 of the information retrieval system 10. In an embodiment, the search attribute 125 is pre-selected or designed for a specific application. This can be done by changing the mapping information 36 stored in the repository 32. For example, an user interface, i.e., a pull-down menu, can be provided such that an administrator can modify the mapping information 36 in the information retrieval system 10. The administrative user interface will be discussed in more detail below. Alternatively, the search attribute 125 can be selected or input by a user, i.e., through a user interface provided by the browser 14, during use of the information retrieval system 10.

Figure 3B:
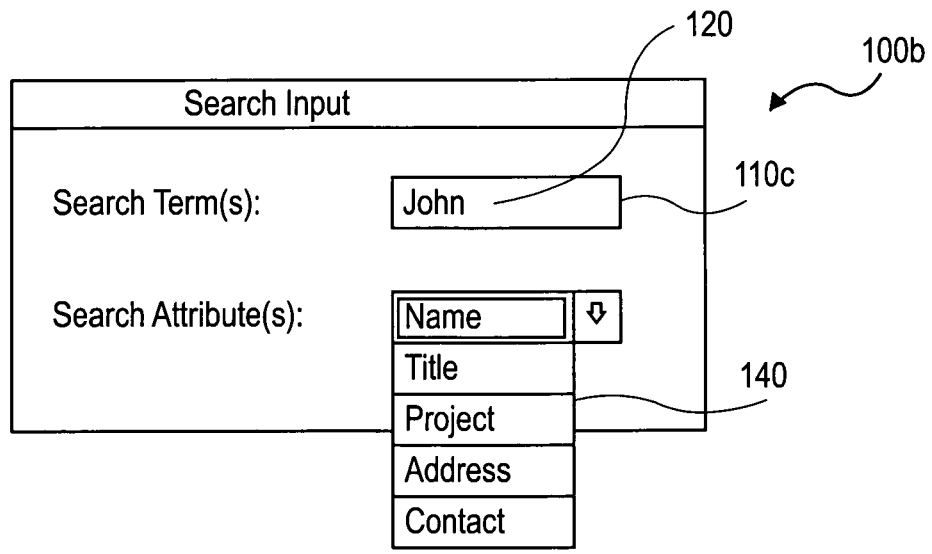
FIG. 3B is another example of an input window used to receive input for the information retrieval system, particularly showing a pull-down menu.

FIG. 3B shows another example of a user interface 100b for receiving the input 52. The user interface 100b includes a field 110c in which the user can type in query term(s) 120. The user interface 100b also includes a pull-down menu 140 in which the user can select a search attribute 125 that corresponds to the subject represented by the search term(s) 120. It should be noted that the user interface illustrated in FIGS. 3A and 3B are only examples of how query term(s) 120 associated with a search attribute 125 can be inputted. User interfaces having other configurations and non-window based input interface can also be used.

Returning to FIG. 2, the information retrieval system 10 is cataloged with the processed data 34 collected at least in part through a collection process 58 and an attribute normalization 60. In the collection process 58, information regarding data, and/or the data itself, from the data source 20 are gathered by the collection framework 12 and organized based on an attribute of the corresponding data from the data source 20. As mentioned previously, the collection framework 12 can be configured to recognize specific metadata from the data source 20 based on the mapping information 36 stored in the repository 32. Alternatively, the collection framework 12 can also be configured to perform general metadata extraction.

Figure 4:
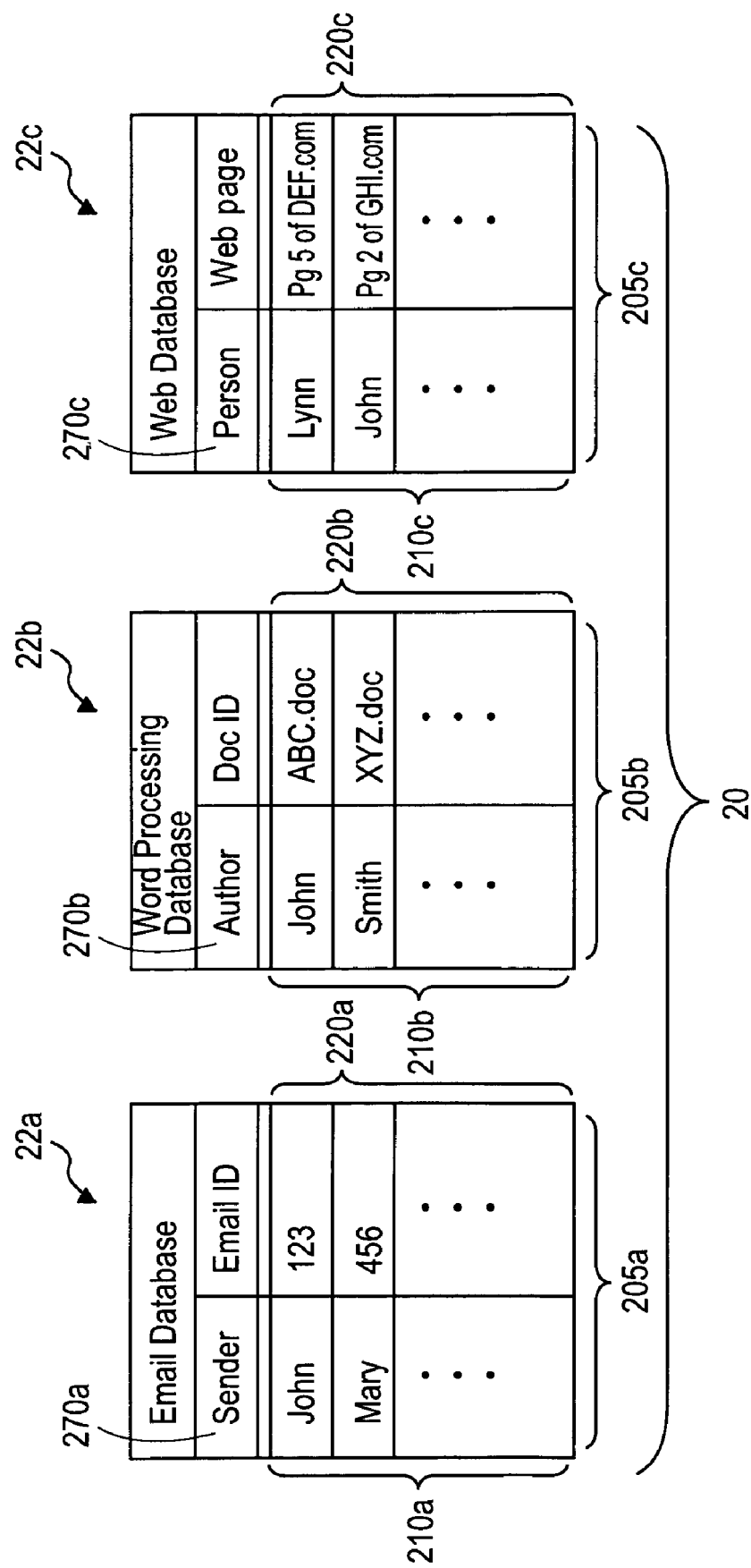
FIG. 4 shows examples of data source from which the information retrieval system can retrieve information, particularly showing an email database, a word processing database, and a web database.

FIG. 4 shows three examples of data sources 20 containing data that can be collected and stored in either or both of the text repository 30 and the repository 32 of the information retrieval system 10. Particularly, FIG. 4 shows an email database 22a, a word processing database 22b, and a web database 22c. The email database 22a contains data 205a such as email sender names 210a and the corresponding email identification 220a. The word database 22b contains data 205b such as author names 210b and identification 220b of documents created by the respective authors. The web database 22c contains data 205c such as person names 210c and identification 220c of the web page that contains the respective name(s) of the person(s). As FIG. 4 shows, the same information (i.e., the name, "John") may be categorized differently in various databases 22. Particularly, the same name, "John," is stored under the categories, "sender", "author", and "person" in the email database 22a, the word database 22b, and the web database 22c, respectively. The categories for the data 205 under which the data 205 is stored is generally a metadata that represents an attribute 270 for the corresponding data 205. For example, an attribute 270a of the data 205, "John," is identified as "sender" in the email database 22a. Similarly, an attribute 270b of the data 205, "John," is identified as "author" in the word processing database 22b. It should be noted that the databases 22 shown in FIG. 3 are only examples of data source from which information can be collected. The data source 20 from which the data is gathered can contain other information.

In the collection process 58, data 205 and attribute 270 of the corresponding data 205 are gathered from the data source 20 and can be stored in the text repository 30 for subsequent processing. Attribute normalization 60 is next performed. In the attribute normalization process 60, the search attribute 125 of the subject represented by the query term(s) 120 is associated with the attribute 270 of the data 205 from the data source 20. For example, the search attribute 125 identified as "name" in FIG. 3A is associated with the attribute 270a, "sender," in the email database 22a of FIG. 4. The same search attribute 125 can also be associated with other attributes 270 in other databases 22. FIG. 5 is a mapping table 300a showing examples of search attributes 125 being associated with different attributes 270 of data 205 from different respective databases 22. The mapping table 300a can be stored as part of the mapping information 36 in the repository 32 of the information retrieval system 10. As shown in the mapping table 300a, the search attribute 125 identified as "name" (the name attribute) is associated with the sender attribute 270a in the email database 22a. The name attribute 125 is also associated with the author attribute 270b and the person attribute 270c in the word processing database 22b and the web database 22c, respectively.

In an embodiment, based on the association of the search attribute(s) 125 with the attributes 270 of data in various databases 22, the attribute normalization process 60 then creates search attribute based indexes 400 (SABI) in which data 205 collected from the various databases 22 are arranged according to a particular search attribute 125. FIG. 6 shows an example of the search attribute based index 400 that contains data 205 from the various databases 22 of FIG. 4. The search attribute based indexes 400 is created based on the search attribute 125, "name," and it includes names 210 and corresponding identification 220 of locations within the databases 22 in which the names 210 are stored. The search attribute based index 400 is created by gathering from the databases 22 of FIG. 3 all the names 210 whose attributes 270 are associated with the search attribute 125 that corresponds to the user input 52. In particular, based on the mapping table 300a of FIG. 4, the search attribute 125, "name," is associated with the sender attribute 270a of the email database 22a, the author attribute 270b of the word processing database 22b, and the person attribute 270c of the web database 22c. As such, sender names 210a, author names 210b, and person names 210c, together with the corresponding identifications 220 of the location in the databases 22 in which they are stored, are collected to create the search attribute based index 400.

Furthermore, search attribute based index 400 can be created based on cross attribute associations. As shown in FIG. 4, author is an attribute 270 that is associated with the search attribute 125, name. However, author is also a search attribute 125 that is associated with the attribute 270, programmer. As such, the search attribute 125, name, is indirectly associated with the attribute 270, programmer. In this case, if cross attribute association is desired, the search attribute based index 400, created based on the search attribute, name, will also include data 205 whose attribute 270 is programmer.

Search attribute based indexes 400 based on other search attributes 125 can be similarly created. For examples, search attribute based indexes 400 can be created based on other search attributes such as title, project, address, and contact, as those shown in FIG. 3B. The search attribute based indexes 400 are then stored in the text repository 30 or in the repository 32 as processed data 34 that can be retrieved by the application server 16.

If desired, the search attribute based indexes 400 can be further processed into a desired format so that data can be retrieved during the query process 62. For example, FIG. 7 shows a name index 500 that is generated by gathering all the identification 220 of the locations in which the name, "John" is stored, into a single field 510. Such a format may be beneficial particularly when it is desirable to invoke text indexing in batch during a processing. The name index 500 can then be stored as processed data 34 in the text repository 30 or the repository 32.

After the attribute normalization 60 is performed, and the desired data is arranged into a desired format, the processed data 34 are then ready to be used in the query process 62. The processed data 34 may be stored on a computer system as computer readable text. Alternatively, the processed data 34 may be accessed via a network, and stored at one or more remote locations. It should be noted that search attribute based indexes 400 can contain other types of data, and are not necessarily limited by the examples shown in the previous examples.

In the query process 62, the user input 52 is processed and it is determined whether an identification of a data in the processed data 34 matches with a search term 120 of the input 52. If desired, the processing of the user input 52 may include text processing in which the query term(s) 120 is normalized to generate linguistic variants. For example, the search term, "Commodore, Inc." can have linguistic variants of "Commodore Inc.", "Commodore, Inc", "Commodore, Incorporated", etc. Textural normalization is described in U.S. Pat. No. 6,094,652, the entirety of which is hereby incorporated by reference.

If a match between a search term 120 (or a linguistic variant of a search term 120) of the user input 52 and a data in the processed data 34 is found, the query processing 62 then provides an output 54 to the user. The output 54 can include a variety of information related to the subject represented by the user input 52. In an embodiment, the output 54 includes identification of a location or an address of the database 22 in which one or more of the search terms 120 of the query input 54, is found. For example, the output 54 can include an identification of a file, or a website, in which one or more of the search terms 120 is found. The output 53 can be in a form of a visual display that can be presented in a screen or a printout. Alternatively, the output 54 can be in a form of data stored in a medium such as a computer, a CD-ROM, a diskette, or a server.

Figure 8:
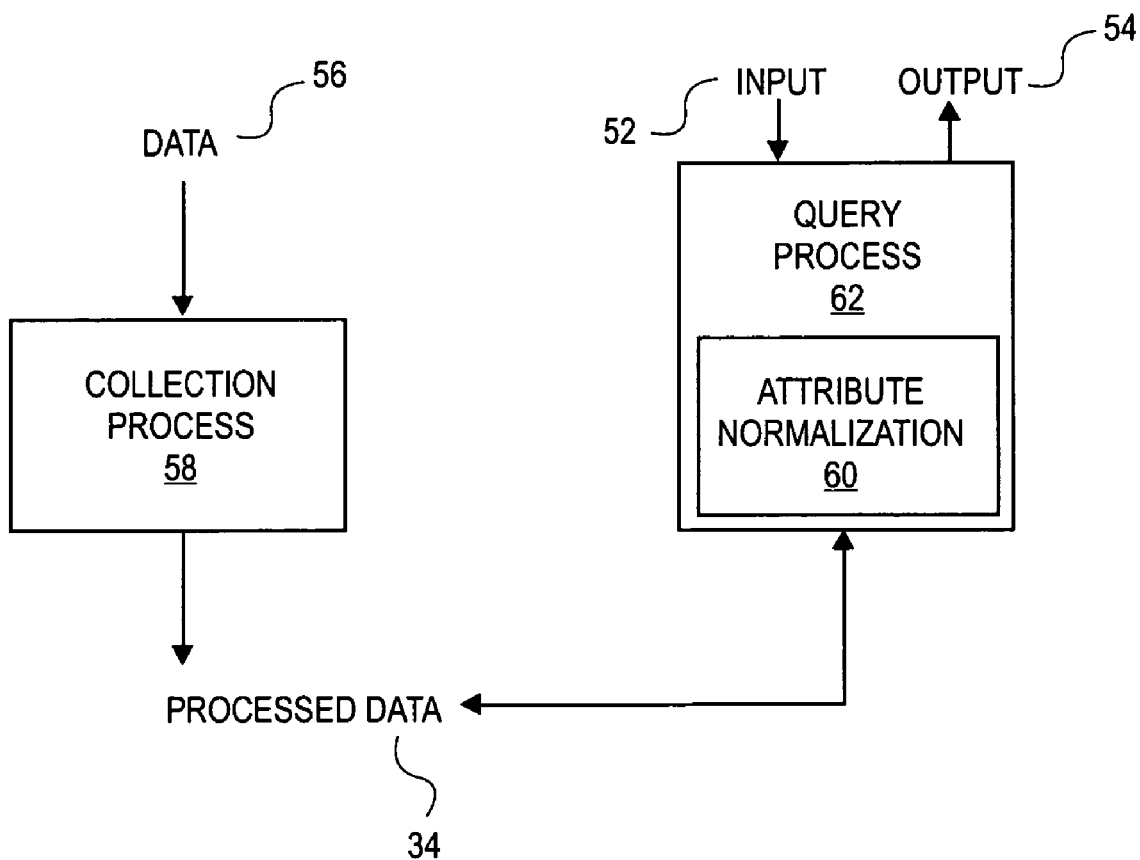
FIG. 8 is a block diagram illustrating a second embodiment of the information retrieval system of the present invention.

FIG. 8 shows a variation of the information retrieval system 10 in which the attribute normalization process 60 is built in the query process 62. In this case, data 205 from various databases 22 are collected by the collection framework 12 during the collection process 58, and are stored in the text repository 30. Because the attribute normalization process 60 is a part of the query process 62, the collection framework 12 is only required to perform general metadata extraction, i.e., the collection framework 12 does not have to look for specific attribute 270 of a data 205 stored in a database 22. Also, it is not necessary to create the search attribute based index table(s) 400 as discussed previously. Rather, in the query process 62, search attribute 125 from the user input 52 and attribute 270 from the various databases 22 are first determined. Next, based on a set of mapping instructions, the search attribute 125 is associated with various attributes 270 of the data stored in the corresponding databases 22. Based on the association, the query processing 62 then extracts various information from the repository 32, and generates the output 54. The output 54 contains information generated as a result of the association between the search attribute 125 and the attribute 270 of the data from the corresponding databases 22.

Figure 9:
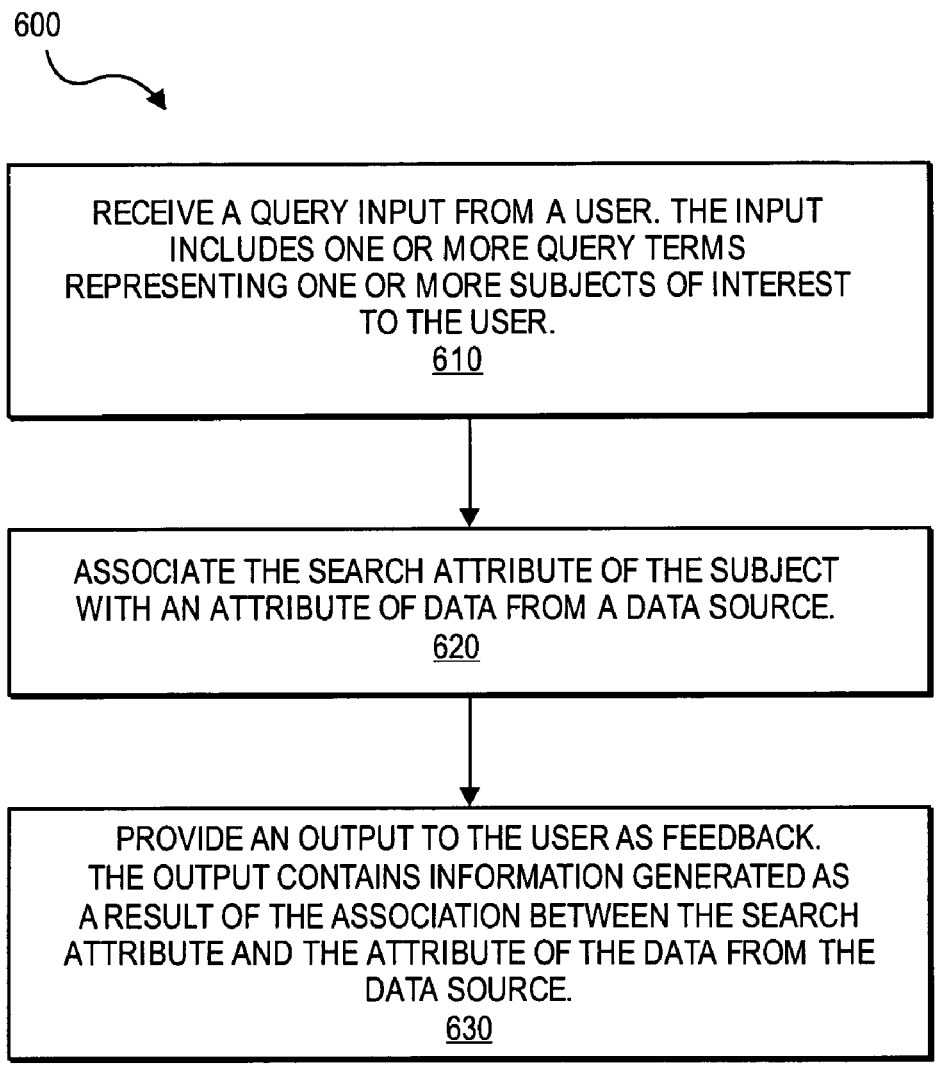
FIG. 9 is a flow chart illustrating the information retrieval process in accordance with an embodiment of the present invention.

FIG. 9 is a flow chart 600, which summarizes the process(es) performed by the above described information retrieval system 10. First, a query input 52 is received from a user. (Step 610) The input 52 includes one or more query terms 120 representing one or more subjects of interest to the user. Each of the subject has a search attribute 125. Next, the search attribute 125 of the subject represented by the one or more terms 120 of the input 52 is associated with an attribute 270 of data from a data source 20. (Step 620) An output 54 which contains information generated as a result of the association between the search attribute 125 and the attribute 270 of the data is then provided to the user as feedback. (Step 630)

It should be understood that the association performed during the attribute normalization 60 is not limited to the search attributes 125 and attributes 270 of data 205 as described in the previous examples, and that the information retrieval system 10 can associate other search attributes 125 with other attributes 270 as well. In an embodiment, a user interface is provided, which allows an administrator to modify the search attributes 125, the attributes 270 of data 205, and/or the association between one or more of the search attributes 125 and one or more of the attributes 270 of the data 205. The user interface may include a display of the mapping table 300*a*, such as that shown in FIG. 5. The mapping table 300*a* can include fields in which the administrator can input, delete, or modify identification of search attribute(s) 125, attribute(s) 270 of the data 205, and the database(s) 22 in which the data 205 is stored. Alternatively, the mapping table 300*a* can include pull-down menu(s) identifying a list of possible search attribute(s) 125, a list of databases 22, and/or a list of available attribute(s) 270 that correspond to the respective databases 22, which the administrator can select.

Figure 10:
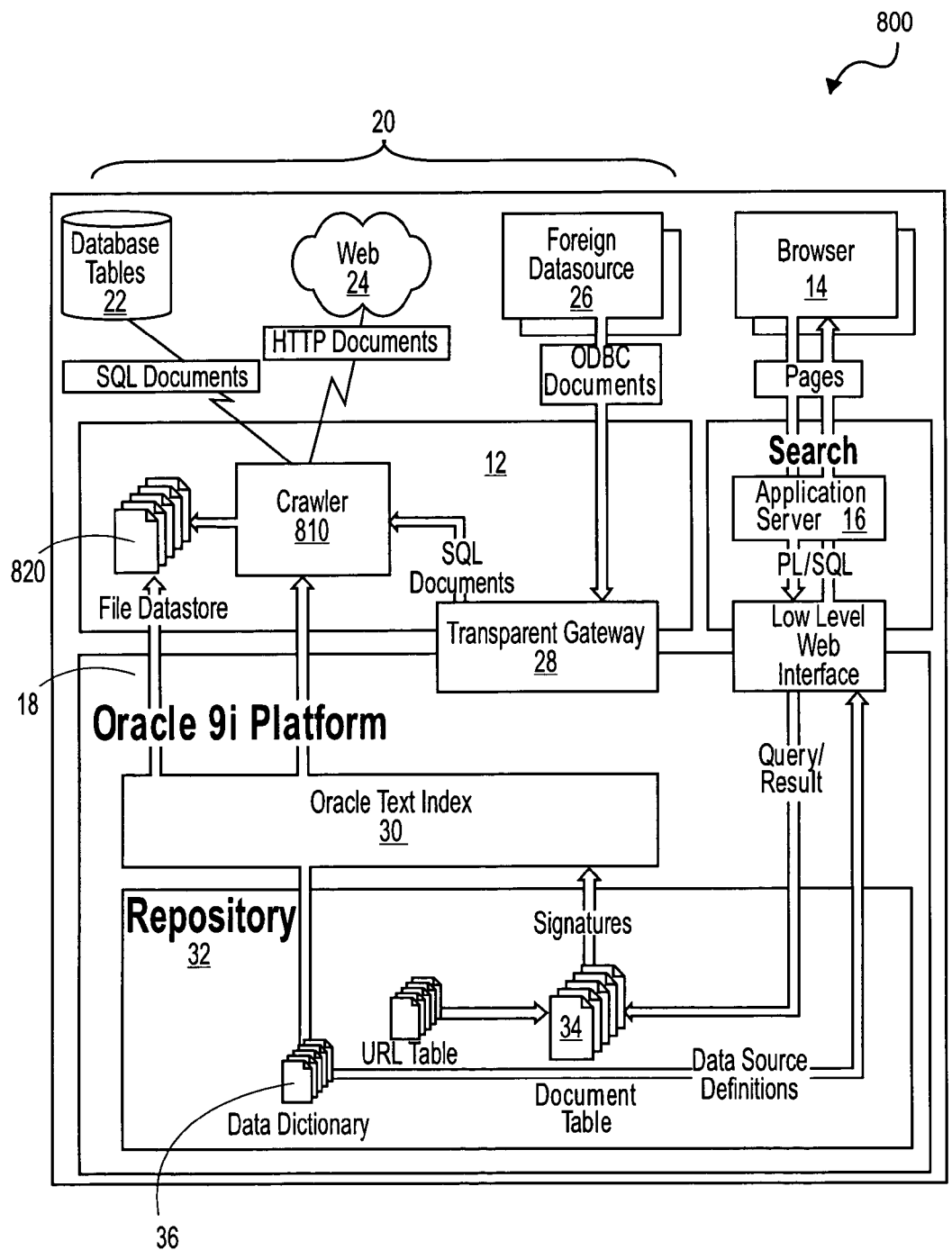
FIG. 10 is a system architecture that includes a repository for storing mapping information in accordance with a specific example of an embodiment of the present invention.

FIG. 10 is a block diagram illustrating an architecture of an information retrieval system 800 in accordance with a specific example of an embodiment of the present invention. The information retrieval system 800 includes a collection framework 12 for collecting data from a data source 20. The extension 28, as described previously, provides a gateway through which data information can be collected from the foreign data source 26. The collection framework 12 may include a crawler 810, which performs the gathering of data from the data source 20, and a file datastore 820, in which the gathered data can be stored. The information retrieval system 800 also includes a browser 14 for obtaining information from and presenting information to a user, an application server 16 for processing information to and from the browser 14, and a platform 18 that includes a text repository 30 and a repository 32, as described previously. The text repository 30 can be a proprietary text repository, such as an Oracle text repository, that stores data collected by the collection framework 12 in a form of text index. The collected data could be collected from the crawler 810 directly, or they could be transferred from the file datastore 820. The collected data can further be processed and be stored in document tables of the repository 32 as processed data 34, as described previously. In addition, before any data is stored in the document table, based on the content of a set of collected data, the system 800 can compute a signature for a corresponding set of the collected data for duplication protection, as is known in the art. Duplication protection prevents the same set of collected data from being stored into the document table by checking the signature of the previously collected data against the signature of the newly collected data.

The processed data 34 stored in the repository 32 can include, for examples, search attribute based index(es) 400, such as that shown in FIG. 6, and/or index(es) 500, such as that shown in FIG. 7. The repository 32 also stores mapping information 36, such as the mapping table 300*a* shown in FIG. 5, which contains attributes 270 of data (i.e., metadata or data definition) from the respective data source. URL Table, which contains metadata, can also be stored in the repository 32.

The mapping information 36 is accessible by the crawler 810 so that it could look for specific attributes 270 (or types) of data in the data source 20. The mapping information 36 is also accessible by the application server 16 so that a list of available search attributes 125 can be presented to the user through the browser 14. Based on an input 52 by the user, and the corresponding search attribute 125 of the subject represented by a term of the input 52, data is then extracted from the document table and is presented to the user as output 54, as described previously.

Figure 11:
FIG. 11 is a schedule table in accordance with a second aspect of the present invention.

FIG. 11 is a data collection schedule 900, which shows the frequency in which data is collected from a database 22 based on the type of the database 22, according to a second aspect of the present invention. As shown in FIG. 11, for web databases 22 whose extension ends with ".gov", collection of data from those databases 22 is performed every seven days according to the data collection schedule 900. On the other hand, for a specific page of a website, e.g. page 5 of the Oracle.com, the collection of data from the webpage is performed every five minutes according to the data collection schedule 900. The frequency in which the collection is performed can also be based on other criteria. As shown in the example of FIG. 11, the collection of data from the ABC Database is performed when one or more specified criteria are met. The criteria can be a variety of parameters, such as, when an instruction is received from a user, when the size of the database storage exceeds a certain limit, or when the specified database is updated. Other criteria can also be used.

Figure 12:
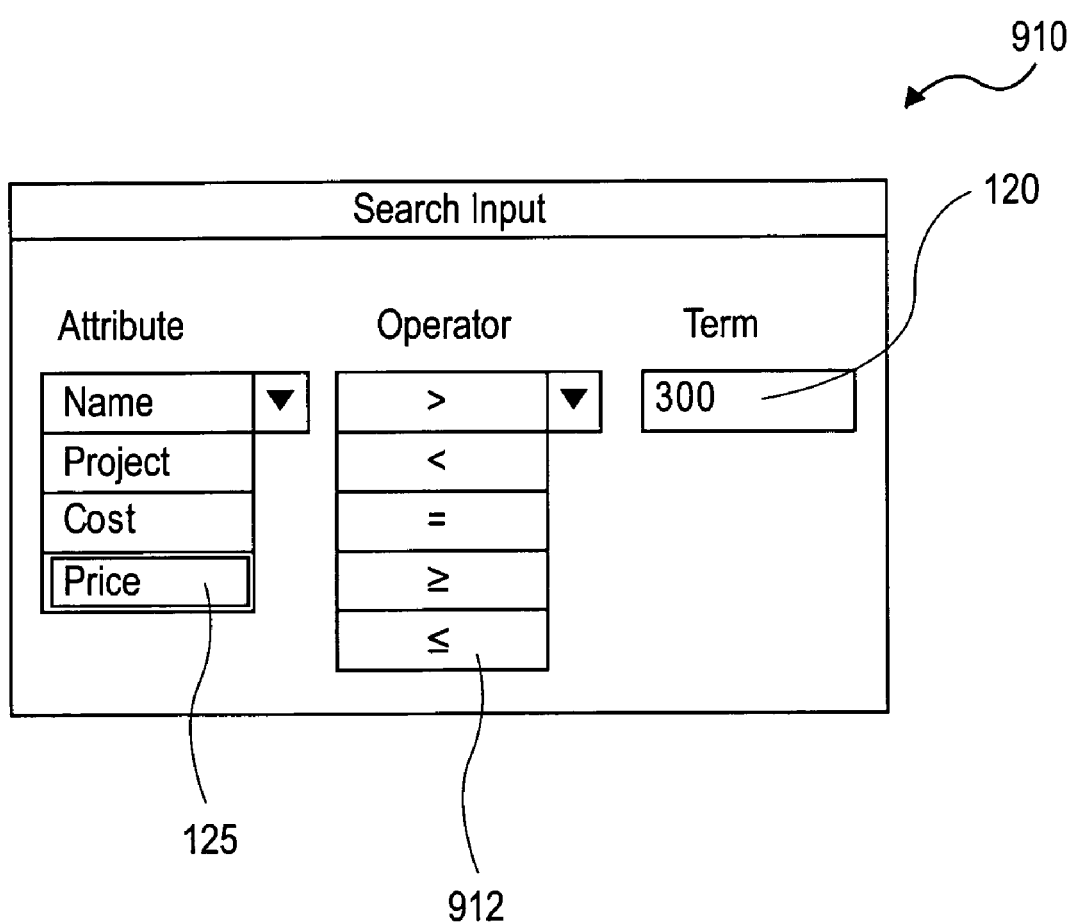
FIG. 12 is a user interface, particularly showing operators that can be selected by a user in accordance with a third aspect of the present invention.

FIG. 12 shows a user interface 910 whereby a user can select an operator 912 to improve the precision of the information retrieval system in accordance with a third aspect of the invention. Depending on the search attribute 125 selected by the user, a different set of available operators 912 may be provided in the user interface 910. The user can then select one of the operators 912 to increase the precision of the search result. For example, if the user selects "price" as the search attribute 125, then numeric operators such as ">", "<", and "=" can be provided to the user. Alternatively, instead of providing the operators to the user (i.e., using a pull down menu), the interface 910 can include a field in which the user can type in an operator. A query input having "price" as the search attribute 125, "<" as the operator 912, and "300*a*" as the search term will direct the information retrieval system to identify numeric data having an attribute associated with the search attribute "price" and is less than 300*a*. Each of the available search attributes 125 can have a corresponding set of operators. As another example, if the user selects "name" as the search attribute 125, then textural operators such as "containing", "excluding", "within 3 words", "within the same paragraph", "and", and "or", can be provided to the user. Using a textural operator, a user can, for example, direct the information retrieval system to identify textual data, "John" having an attribute associated with the search attribute "name" and is within three words from the term, "piano". Other operators known in the art, and/or customized operators can also be used.

As shown in the previous examples and embodiments, the information retrieval system 10 allows data 205 stored in the various databases 22 and having different attributes 270 to be retrieved based on an association between the search attribute 125 and the attributes 270 of the data 205. As such, the information retrieval system 10 allows knowledge of data to be shared and transferred within and among business entities, and allows retrieval of information spread over numerous otherwise disconnected and incompatible applications within a network. Furthermore, because the association between the search attribute 125 and the attributes 270 of data 205 provides additional criteria for retrieving data that corresponds to the subject represented by the user input 52, the above described system also provides effective information retrieval having improved precision.

Figure 13:
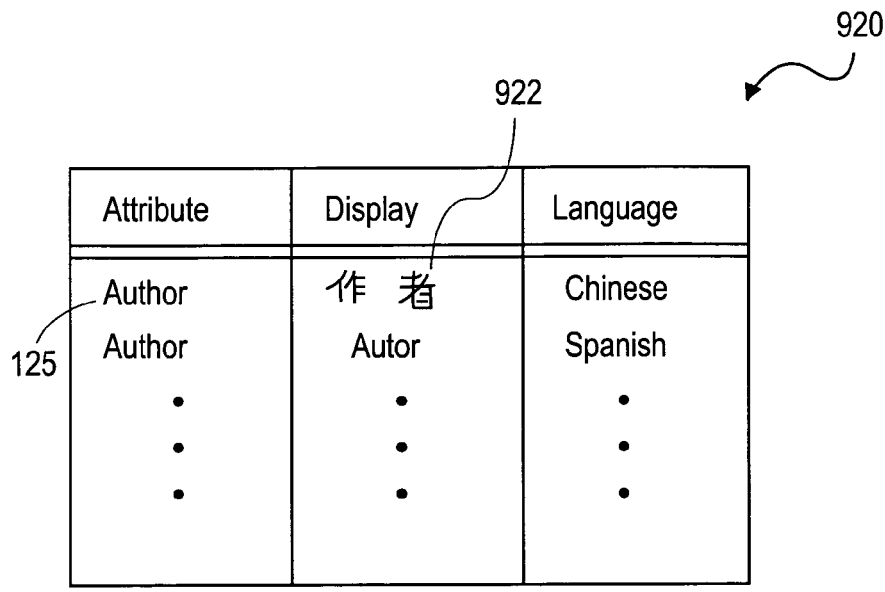
FIG. 13 is a translation table for search attributes.
Figure 14:
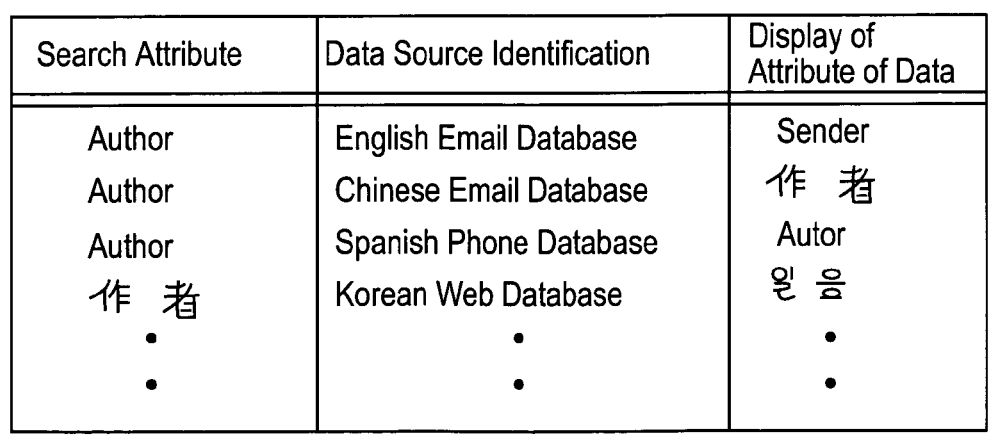
FIG. 14 is an attribute mapping table, particularly showing an English search attribute being mapped with attributes in other languages.

It should be noted that the information retrieval system 10 described previously is not necessarily limited to retrieving English information from a data source. The information retrieval system 10 can be used to retrieve information in other languages, such as Chinese, Japanese, Korean, Spanish, etc., from a data source. FIG. 13 shows a translation table 920, illustrating how an English search attribute 125 can be translated to other languages having different displays 922. In a preferred embodiment, the translation table 920 is stored in the repository 32, from which an administrator can access the translation table 920 and make changes to the translation. In the user interface (such as that shown in FIGS. 3A, 3B, and 12), a field or a pull-down menu can be provided which allows the user to select a desired language. If the user selects "Chinese" as the desired language, for example, then the user interface will display the list of available search attributes 125 in Chinese based on the translation provided in the translation table 920. In the attribute normalization 60, the search attribute 125 can be associated with search attributes 270 that are in the same language as that of the search attribute 125. Alternatively, the search attribute 125 can be associated with search attributes 270 in languages that are different from that of the search attribute 125. In this case, a mapping table for multiple associations among attributes of different languages can be used. FIG. 14 shows an example of a mapping table 300*b* that provides multiple associations among attributes of different languages. As shown in FIG. 14, an English search attribute 125 can be associated with attributes 270 in other languages (i.e., attributes 270 having different displays) from different databases. Based on the association, the information retrieval system 10 then generates the output 54. The output 54 can be presented to the user in one language, such as the language selected by the user, or in multiple languages (e.g., displaying identification of databases in different languages from which a search term is found).

Computer System

Figure 15:
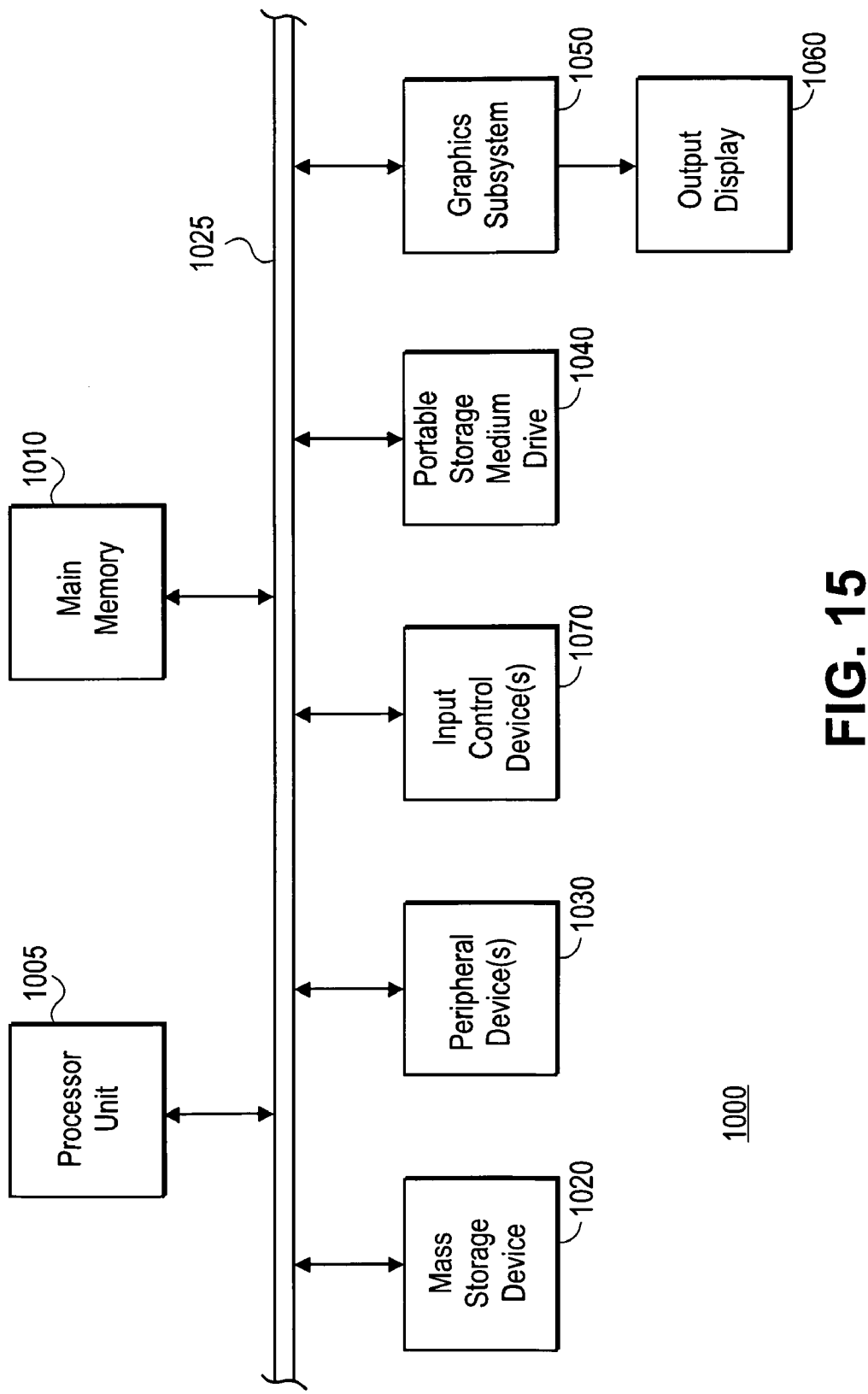
FIG. 15 is a high level block diagram of a general purpose computer system in which the information retrieval system of the present invention may be implemented.

FIG. 15 illustrates a high level block diagram of a general purpose computer system in which the information retrieval system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the information retrieval system of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 15 as being connected via the bus 1025. However, the computer system 1000 may be connected through one or more data transport means. For example, the processor unit 1005 and the main memory 1010 may be connected via a local microprocessor bus, and the mass storage device 1020, peripheral device (2) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the information retrieval system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the information retrieval system software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, the documents may be input to the computer system 1000 via a portable storage medium or a network for processing by the information retrieval system.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

The information retrieval system may be implemented in either hardware or software. For the software implementation, the information retrieval system is software that includes a plurality of computer executable instructions for implementation on a general purpose computer system. Prior to loading into a general purpose computer system, the information retrieval system software may reside as encoded information on a computer readable medium, such as a magnetic floppy disk, magnetic tape, and compact disc read only memory (CD-ROM). In one hardware implementation, the information retrieval system may comprise a dedicated processor including processor instructions for performing the functions described herein. Circuits may also be developed to perform the functions described herein. The mapping table 300a and the search attribute based index 400 may be stored in memory for use by the information retrieval system.

Thus, although several embodiments have been shown and described, it would be apparent to those skilled in the art that many changes and modifications may be made thereunto without the departing from the scope of the invention, which is defined by the following claims and their equivalents.

What is claimed is:

1. A computer-implemented method for providing a query feedback to a user in an information retrieval system, comprising:
receiving a query input from a user, said query comprising one or more terms representing one or more subjects of interest to the user, each of said one or more subjects having a search attribute corresponding to a first database;
collecting data from a data source, said data having an attribute corresponding to a second database;
associating said search attribute corresponding to the first database with said attribute corresponding to the second database of said data from said data source, wherein said attribute is not said search attribute; and
executing the query input to generate a result based on said association, wherein the result comprises results from (a) querying the first database using said search attribute and a term from said one or more terms for said search attribute, and (b) querying the second database using said attribute and said term from said one or more terms for said search attribute.

2. The computer-implemented method of claim 1, wherein said collecting comprises accessing mapping information stored in a medium, said mapping information identifies said attribute of data that is to be collected from said data source.

3. The computer-implemented method of claim 1, wherein said collecting comprises arranging said data from said data source into a searchable index.

4. The computer-implemented method of claim 3, wherein said searchable index is a search attribute based index.

5. The computer-implemented method of claim 1, wherein said collecting is performed at a frequency that is data source dependent.

6. The computer-implemented method of claim 5, wherein said collecting is performed at a frequency based on a type of said data source.

7. The computer-implemented method of claim 1, wherein said collecting is performed at a frequency when a criteria is met.

8. The computer-implemented method of claim 1, wherein said receiving comprises displaying a window in a screen, said window comprising a field in which said user can input said one or more terms of said query input.

9. The computer-implemented method of claim 8, wherein said window further comprising identification of said search attribute associated with said subject represented by said one or more terms inputted in said field.

10. The computer-implemented method of claim 8, wherein said window further comprising a list of identification of one or more search attributes that are selectable by said user.

11. The computer-implemented method of claim 8, wherein said window further comprising an input field in which said user can type in a desired language.

12. The computer-implemented method of claim 8, wherein said window further comprising a menu identifying a list of one or more languages that are selectable by said user.

13. The computer-implemented method of claim 8, wherein said window further comprising an input field in which said user can type in an operator.

14. The computer-implemented method of claim 8, wherein said window further comprising a menu identifying a list of one or more operators that are selectable by said user.

15. The computer-implemented method of claim 1, wherein said search attribute is in a language that is different from that of said attribute of said data from said data source.

16. The computer-implemented method of claim 1, wherein said associating comprises accessing mapping information stored in a medium, said mapping information identifying said attribute of data that are to be associated with said search attribute.

17. The computer-implemented method of claim 16, further comprising inputting said mapping information in said medium.

18. The computer-implemented method of claim 17, wherein said inputting is performed through a user interface displayed in a screen.

19. The computer-implemented method of claim 17, wherein said inputting comprises selecting a search attribute to be associated with said attribute of said data from said data source.

20. The computer-implemented method of claim 17, wherein said inputting comprises selecting an attribute of data from a data source to be associated with a search attribute.

21. A computer-implemented process that generates a display of information, said process comprising the steps of:
   receiving a query input from a user, said query comprising one or more terms representing one or more subjects of interest to the user, each of said one or more subjects having a search attribute corresponding to a first database;
   collecting data from a data source, said data having an attribute corresponding to a second database;
   associating said search attribute with said attribute of said data from said data source, wherein said attribute is not said search attribute; and
   generating a display of information comprising a result from executing the query input based on said association, wherein the result comprises results from (a) querying the first database using said search attribute and a term from said one or more terms for said search attribute, and (b) querying the second database using said attribute and said term from said one or more terms for said search attribute.

22. The computer-implemented process of claim 21, wherein said collecting comprises accessing mapping information stored in a medium, said mapping information identifies said attribute of data that is to be collected from said data source.

23. The computer-implemented process of claim 21, wherein said collecting comprises arranging said data from said data source into a searchable index.

24. The computer-implemented process of claim 23, wherein said searchable index is a search attribute based index.

25. The computer-implemented process of claim 21, wherein said collecting is performed at a frequency that is data source dependent.

26. The computer-implemented process of claim 25, wherein said collecting is performed at a frequency based on a type of said data source.

27. The computer-implemented process of claim 21, wherein said collecting is performed at a frequency when a criteria is met.

28. The computer-implemented process of claim 21, wherein said receiving comprises displaying a window in a screen, said window comprising a field in which said user can input said one or more terms of said query input.

29. The computer-implemented process of claim 28, wherein said window further comprising identification of said search attribute associated with said subject represented by said one or more terms inputted in said field.

30. The computer-implemented process of claim 28, wherein said window further comprising a list of identification of one or more search attributes that are selectable by said user.

31. The computer-implemented process of claim 28, wherein said window further comprising an input field in which said user can type in a desired language.

32. The computer-implemented process of claim 28, wherein said window further comprising a menu identifying a list of one or more languages that are selectable by said user.

33. The computer-implemented process of claim 28, wherein said window further comprising an input field in which said user can type in an operator.

34. The computer-implemented process of claim 28, wherein said window further comprising a menu identifying a list of one or more operators that are selectable by said user.

35. The computer-implemented process of claim 21, wherein said search attribute is in a language that is different from that of said attribute of said data from said data source.

36. The computer-implemented process of claim 21, wherein said associating comprises accessing mapping information stored in a medium, said mapping information identifying said attribute of data that are to be associated with said search attribute.

37. The computer-implemented process of claim 36, wherein said process further comprising inputting said mapping information in said medium.

38. The computer-implemented process of claim 37, wherein said inputting is performed through a user interface displayed in a screen.

39. The computer-implemented process of claim 37, wherein said inputting comprises selecting a search attribute to be associated with said attribute of said data from said data source.

40. The computer-implemented process of claim 37, wherein said inputting comprises selecting an attribute of data from a data source to be associated with a search attribute.

41. A method of retrieving information from a server, the method comprising:
   inputting a query input through a user interface, said query input comprising one or more terms representing one or more subjects of interest to a user, each of said one or more subjects having a search attribute corresponding to a first database; and
   receiving a feedback from a server that contains information generated by a process, said process comprising the steps of
   collecting data from a data source, said data having an attribute corresponding to a second database
   associating said search attribute with said attribute of said data from said data source, wherein said attribute is not said search attribute;
   generating a feedback data comprising a result from executing the query input to generate a result based on said association, wherein the result comprises results from (a) querying the first database using said search attribute and a term from said one or more terms for said search attribute, and (b) querying the second database using said attribute and said term from said one or more terms for said search attribute; and
   storing said feedback data in the server.

42. The method of claim 41, wherein said inputting comprises typing said one or more terms of said query input into a field within a window.

43. The method of claim 42, wherein said window further comprising identification of said search attribute associated with said subject represented by said one or more terms inputted in said field.

44. The method of claim 42, wherein said inputting further comprises selecting said search attribute from a menu identifying a list of one or more search attributes.

45. The method of claim 42, wherein said inputting further comprises typing an identification of a desired language in a field presented in said window.

46. The method of claim 42, wherein said inputting further comprises selecting a desired language from a menu identifying a list of one or more languages.

47. The method of claim 42, wherein said inputting further comprises typing an operator in a field presented in said window.

48. The method of claim 42, wherein said inputting further comprises selecting an operator from a menu identifying a list of one or more operators.

49. The method of claim 41, wherein said collecting comprises accessing mapping information stored in a medium, said mapping information identifies said attribute of data that is to be collected from said data source.

50. The method of claim 41, wherein said collecting comprises arranging said data from said data source into a searchable index.

51. The method of claim 50, wherein said searchable index is a search attribute based index.

52. The method of claim 41, wherein said collecting is performed at a frequency that is data source dependent.

53. The method of claim 52, wherein said collecting is performed at a frequency based on a type of said data source.

54. The method of claim 41, wherein said collecting is performed at a frequency when a criteria is met.

55. The method of claim 41, wherein said search attribute is in a language that is different from that of said attribute of said data from said data source.

56. The method of claim 41, wherein said associating comprises accessing mapping information stored in a medium, said mapping information identifying said attribute of data that are to be associated with said search attribute.

57. The method of claim 56, further comprising inputting said mapping information in said medium.

58. The method of claim 57, wherein said inputting is performed through a user interface displayed in a screen.

59. The method of claim 57, wherein said inputting comprises selecting a search attribute to be associated with said attribute of said data from said data source.

60. The method of claim 57, wherein said inputting comprises selecting an attribute of data from a data source to be associated with a search attribute.

61. An application server containing data generated by a process, said process comprising the steps of:
   accessing mapping information stored in a medium, said mapping information identifying a search attribute corresponding to a first database, said mapping information identifying attributes from a plurality of different databases associated with said search attribute at a data source, said attributes are not said search attribute;
   collecting said mapping information;
   storing said mapping information in a server;
   receiving a query input from a user, said query comprising one or more terms representing one or more subjects of interest to the user, each of said one or more subjects having a search attribute;
   associating said search attribute corresponding to the first database with an attribute from said attributes;
   generating a feedback data comprising a result from executing the query input based on said association, wherein the result comprises results from (a) querying the first database using said search attribute and a term from said one or more terms for said search attribute, and (b) querying the second database using said attribute and said term from said one or more terms for said search attribute; and
   storing said feedback data in said server.

62. The application server of claim 61, wherein said medium is a computer diskette.

63. The application server of claim 61, wherein said medium is a server.

64. The application server of claim 61, wherein said mapping information identifying attributes of data in more than one languages.

65. The application server of claim 61, wherein said mapping information further identifying said attribute of data that are to be associated with said search attribute, and said associating comprises accessing said mapping information stored in said medium.

66. The application server of claim 61, wherein said search attribute is in a language that is different from that of said attribute of said mapping information from said data source.

67. A computer-readable storage medium for storing program instructions executed by a processor to provide:
   mapping information for use in an information retrieval system, said information retrieval system receiving a query input from a user, said query comprising one or more terms representing one or more subjects of interest to said user, each of said one or more subjects having a search attribute corresponding to a first database, said information retrieval system is providing a feedback to said user, said feedback containing information generated as a result of executing the query input based on an association between said search attribute and an attribute corresponding to a second database of data from a data source, wherein the result comprises results from (a) querying the first database using said search attribute and a term from said one or more terms for said search attribute, and (b) querying the second database using said attribute and said term from said one or more terms for said search attribute, wherein said mapping information comprises:
   data for use by said information retrieval system to create said association between said search attribute and said attribute of data from said data source, wherein said attribute is not said search attribute.

68. The computer-readable storage medium of claim 67, wherein said data of said mapping information comprises identification of said search attribute.

69. The computer-readable storage medium of claim 67, wherein said data of said mapping information comprises identification of said attribute of said data from said data sources.

70. The computer-readable storage medium of claim 67, wherein said data of said mapping information comprises identification of said data source.

71. The computer-readable storage medium of claim 67, wherein said data of said mapping information comprises identification of attributes in more than one languages.

* * * * *

UNITED STATES PATENT AND TRADEMARK OFFICE
CERTIFICATE OF CORRECTION

PATENT NO. : 7,509,303 B1
APPLICATION NO. : 10/349762
DATED : March 24, 2009
INVENTOR(S) : Chen It is certified that error appears in the above-identified patent and that said Letters Patent is hereby corrected as shown below:

On page 2, in column 1, under "Other Publications", line 19, delete "Symposiun" and insert -- Symposium --, therefor.

In column 7, line 25, delete "54," and insert -- 54 --, therefor.

In column 7, line 65, delete "(Step 630)" and insert -- (Step 630). --, therefor.

In column 8, lines 31-51, delete "The information retrieval system 800 also includes a browser 14 for obtaining information from and presenting information to a user, an application server 16 for processing information to and from the browser 14, and a platform 18 that includes a text repository 30 and a repository 32, as described previously. The text repository 30 can be a proprietary text repository, such as an Oracle text repository, that stores data collected by the collection framework 12 in a form of text index. The collected data could be collected from the crawler 810 directly, or they could be transferred from the file datastore 820. The collected data can further be processed and be stored in document tables of the repository 32 as processed data 34, as described previously. In addition, before any data is stored in the document table, based on the content of a set of collected data, the system 800 can compute a signature for a corresponding set of the collected data for duplication protection, as is known in the art. Duplication protection prevents the same set of collected data from being stored into the document table by checking the signature of the previously collected data against the signature of the newly collected data." and insert the same on Col. 8, Line 32, below "stored." as a new paragraph.

Signed and Sealed this

Twenty-fifth Day of May, 2010

David J. Kappos
*Director of the United States Patent and Trademark Office*